(12) United States Patent
Coughlan, III et al.

(10) Patent No.: US 8,015,829 B2
(45) Date of Patent: Sep. 13, 2011

(54) COMBUSTOR

(75) Inventors: Joseph D. Coughlan, III, South Glastonbury, CT (US); Monica Pacheco-Tougas, Manchester, CT (US); James B. Hoke, Tolland, CT (US); Alan J. Goetschius, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 956 days.

(21) Appl. No.: 12/037,128

(22) Filed: Feb. 26, 2008

(65) Prior Publication Data

US 2009/0293488 A1 Dec. 3, 2009

Related U.S. Application Data

(62) Division of application No. 10/691,790, filed on Oct. 23, 2003, now Pat. No. 7,363,763.

(51) Int. Cl.
*F23R 3/42* (2006.01)
(52) U.S. Cl. ............... 60/804; 60/754; 60/755; 60/805
(58) Field of Classification Search .............. 60/802, 60/755, 756, 757, 805, 804
See application file for complete search history.

(56) References Cited

U.S. PATENT DOCUMENTS

| | | | |
|---|---|---|---|
| 4,446,693 A * | 5/1984 | Pidcock et al. | 60/757 |
| 4,695,247 A * | 9/1987 | Enzaki et al. | 60/757 |
| 4,901,522 A | 2/1990 | Commaret et al. | |
| 5,027,604 A | 7/1991 | Krueger | |
| 5,363,643 A | 11/1994 | Halila | |
| 5,417,545 A * | 5/1995 | Harrogate | 60/757 |
| 5,435,139 A | 7/1995 | Pidcock et al. | |
| 5,560,197 A | 10/1996 | Ansart et al. | |
| 5,758,503 A | 6/1998 | DuBell et al. | |
| 5,782,294 A | 7/1998 | Froemming et al. | |
| 6,029,455 A | 2/2000 | Sandelis | |
| 6,240,731 B1 | 6/2001 | Hoke et al. | |
| 6,408,628 B1 | 6/2002 | Pidcock et al. | |
| 6,470,685 B2 | 10/2002 | Pidcock et al. | |
| 6,606,861 B2 | 8/2003 | Snyder | |
| 6,701,714 B2 | 3/2004 | Burd et al. | |
| 7,093,439 B2 | 8/2006 | Pacheco-Tougas et al. | |
| 7,146,815 B2 | 12/2006 | Burd | |

OTHER PUBLICATIONS

European Search Report for EP08021515, dated Feb. 9, 2009.

* cited by examiner

*Primary Examiner* — Ted Kim
(74) *Attorney, Agent, or Firm* — Bachman & LaPointe, P.C.

(57) ABSTRACT

A gas turbine engine combustor has forward bulkhead extending between inboard and outboard walls and cooperating therewith to define a combustor interior volume or combustion chamber. At least one of the walls has an exterior shell and an interior shell including a number of panels. Each panel has interior and exterior surfaces and a perimeter having leading and trailing edges and first and second lateral edges. A number of cooling passageways have inlets on the panel exterior surface and outlets on the panel interior surface. The shell has a plurality of holes for directing air to a space between the shell and heat shield and adapted for preferentially directing said air toward leading edge portions of first stage vanes of a turbine section.

19 Claims, 6 Drawing Sheets

COMBUSTOR

CROSS-REFERENCE TO RELATED APPLICATION

This is a divisional application of Ser. No. 10/691,790, filed Oct. 23, 2003, now U.S. Pat. No. 7,363,763, and entitled COMBUSTOR, the disclosure of which is incorporated by reference herein in its entirety as if set forth at length.

BACKGROUND OF THE INVENTION

This invention relates to combustors, and more particularly to combustors for gas turbine engines.

Gas turbine engine combustors may take several forms. An exemplary class of combustors features an annular combustion chamber having forward/upstream inlets for fuel and air and aft/downstream outlet for directing combustion products to the turbine section of the engine. An exemplary combustor features inboard and outboard walls extending aft from a forward bulkhead in which swirlers are mounted and through which fuel nozzles/injectors are accommodated for the introduction of inlet air and fuel. Exemplary walls are double structured, having an interior heat shield and an exterior shell. The heat shield may be formed in segments, for example, with each wall featuring an array of segments two or three segments longitudinally and 8-12 segments circumferentially. To cool the heat shield segments, air is introduced through apertures in the segments from exterior to interior. The apertures may be angled with respect to longitudinal and circumferential directions to produce film cooling along the interior surface with additional desired dynamic properties. This cooling air may be introduced through a space between the heat shield panel and the shell and, in turn, may be introduced to that space through apertures in the shell. Exemplary heat shield constructions are shown in U.S. Pat. Nos. 5,435,139 and 5,758,503. Exemplary film cooling panel apertures are shown in U.S. Patent Application Publication 2002/0116929A1 (now U.S. Pat. No. 6,606,861) and U.S. patent application Ser. No. 10/147,571 (now U.S. Pat. No. 7,093,439), the disclosures of which are incorporated by reference as if set forth at length.

Exemplary combustors are operated in a rich-quench-lean (RQL) mode. In an exemplary RQL combustor, a portion of the fuel-air mixing and combustion occurs in an upstream portion of the combustor in which the fuel-air mixture is rich (i.e., the spatial average composition is greater than stoichiometric). In this portion of the combustor, the fuel from the nozzles mix with air from the swirlers and participative cooling air in the fore portion of the combustor. In an intermediate quench portion, additional air flow ("process air") is introduced through orifices in the combustor walls to further mix with the fuel-air mixture and, over a short axial distance, transition the mixture to lean (i.e., less than stoichiometric) on a spatially averaged basis. This is often termed quenching of the reaction as, given typical fuel-air ratios, most of the energy in the fuel has been converted by reacting. In a downstream region, the mixture is lean and diluted to the design point overall fuel-air ratio as participative cooling further dilutes the mixture. An exemplary RQL combustor is shown in the aforementioned U.S. '929 publication.

SUMMARY OF THE INVENTION

One aspect of the invention involves a gas turbine engine combustor. A forward bulkhead extends between inboard and outboard walls and cooperates therewith to define a combustor interior volume or combustion chamber. At least one of the walls has an exterior shell and an interior shell including a number of panels. Each panel has interior and exterior surfaces and a perimeter having leading and trailing edges and first and second lateral edges. A number of cooling passageways have inlets on the panel exterior surface and outlets on the panel interior surface. A rail protrudes from the exterior surface and is recessed from the leading edge by 3-10 mm along a majority of the leading edge.

In various implementations, the rail may contact the shell. The first wall may be the outboard wall. The inboard wall may have a similar structure. The shell may have a number of apertures positioned to direct cooling air against the panel exterior surface between the leading edge and the rail. The apertures may be positioned to preferentially direct such cooling air along areas circumferentially aligned with fuel injectors. The rail may be recessed along the entire leading edge by at least 3.5 mm. There may be a gap between the exterior surface and the shell having a height of 1-3 mm.

Another aspect of the invention involves a gas turbine engine combustor where at least one of the heat shield panels has a number of pins protruding from the exterior surface toward the shell and the shell has a number of holes for directing air to a space between the shell and the panel and adapted for preferentially directing the air toward leading edge portions of first stage vanes of a turbine section. Such panels may be the aft circumferential array of panels in the combustor. The holes may include a number of alternating first and second groups of holes having at least partial differences in at least one of size and distribution. The pins may contact the shell. The pins may be in a continuous uninterrupted array along the panel. The pins may be in a number of circumferential rows, each row being out of phase with any adjacent row.

The details of one or more embodiments of the invention are set forth in the accompanying drawings and the description and claims below.

BRIEF DESCRIPTION OF THE DRAWINGS

Like reference numbers and designations in the various drawings indicate like elements.

DETAILED DESCRIPTION

Figure 1:
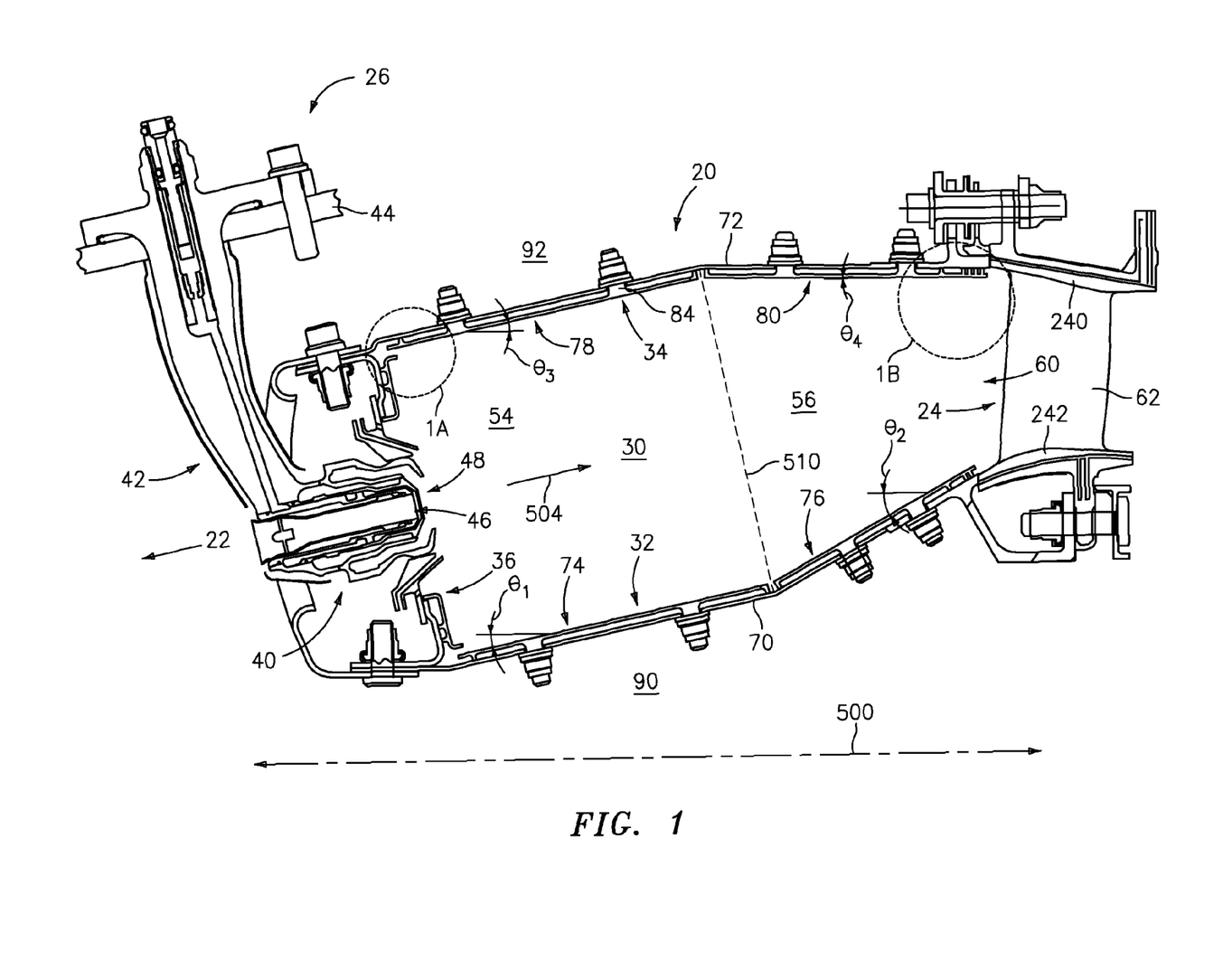
FIG. 1 is a longitudinal sectional view of a gas turbine combustor.

FIG. 1 shows an exemplary combustor 20 positioned between compressor and turbine sections 22 and 24 of a gas turbine engine 26 having a central longitudinal axis or centerline 500 (spacing contracted). The exemplary combustor includes an annular combustion chamber 30 bounded by inner (inboard) and outer (outboard) walls 32 and 34 and a forward bulkhead 36 spanning between the walls. The bulkhead carries a circumferential array of swirlers 40 and associated fuel injectors 42. The exemplary fuel injectors extend through the engine case 44 to convey fuel from an external source to the associated injector outlet 46 at the associated swirler 40. The swirler outlet 48 thus serves as an upstream fuel/air inlet to the combustor. A number of sparkplugs (not shown) are positioned with their working ends along an upstream portion 54 of the combustion chamber 30 to initiate combustion of the fuel/air mixture. The combusting mixture is driven downstream within the combustor along a principal flowpath 504 through a downstream portion 56 to a combustor outlet 60 immediately ahead of a turbine fixed vane stage 62.

The exemplary walls 32 and 34 are double structured, having respective outer shells 70 and 72 and inner heat shields. The exemplary heat shields are formed as multiple circumferential arrays (rings) of panels (e.g., inboard fore and aft panels 74 and 76 and outboard fore and aft panels 78 and 80). Exemplary panel and shell material are high temperature or refractory metal superalloys optionally coated with a thermal and/or environmental coating. Alternate materials include ceramics and ceramic matrix composites. Various known or other materials and manufacturing techniques may be utilized. In known fashion or otherwise, the panels may be secured to the associated shells such as by means of threaded studs 84 integrally formed with the panels and supporting major portions of the panels with major portions of their exterior surfaces facing and spaced apart from the interior surface of the associated shell. The exemplary shells and panels are foraminate, passing cooling air from annular chambers 90 and 92 respectively inboard and outboard of the walls 32 and 34 into the combustion chamber 30. The exemplary panels may be configured so that the intact portions of their inboard surfaces are substantially frustoconical. Viewed in longitudinal section, these surfaces appear as straight lines at associated angles to the axis 500. In the exemplary embodiment, the interior surface panel of inboard fore panel 74 is aftward/downstream diverging relative to the axis 500 at an angle $\theta_1$. The interior surface of the inboard aft panel 76 is similarly diverging at a greater angle $\theta_2$. The interior surface of the fore outboard panel 78 is aftward/downstream diverging at a very small angle $\theta_3$. The interior surface of the aft outboard panel 80 is very close to longitudinal, shown aftward/downstream converging at a small angle $\theta_4$. In the exemplary embodiment, the angles $\theta_1$ and $\theta_3$ are such that the cross-section of the chamber upstream portion 54 is approximately constant in terms of linear sectional dimension but aftward/downstream diverging along the central flowpath in terms of annular cross sectional area. The chamber downstream portion 56 is convergent, although at a much lesser rate. In the exemplary embodiment, the junctions between fore and aft panels substantially define a dividing area 510 between fore and aft combustion chamber portions 54 and 56. Exemplary values for $\theta_1$, $\theta_2$, $\theta_3$, and $\theta_4$ are: 11.894°, 29.074°, 11.894°, and 0.785°, respectively.

Figure 1A:
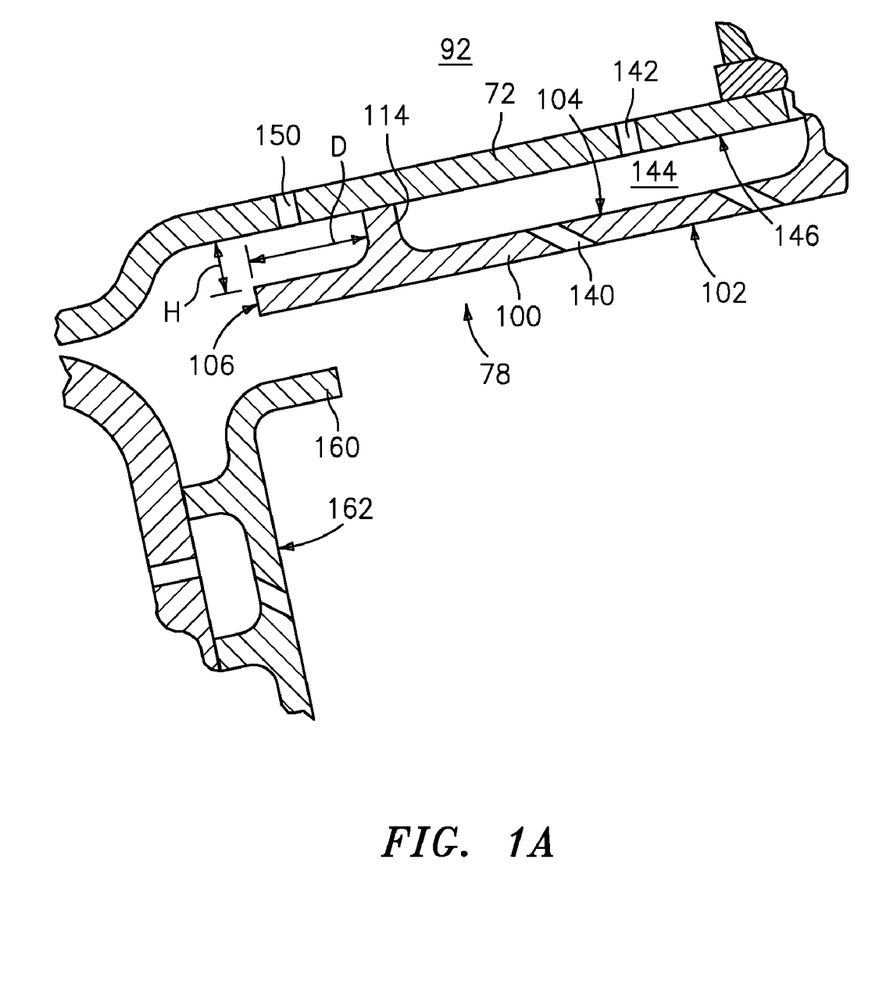
FIG. 1A is an enlarged view of leading portion of an outboard wall of the combustor of FIG. 1.
Figure 2:
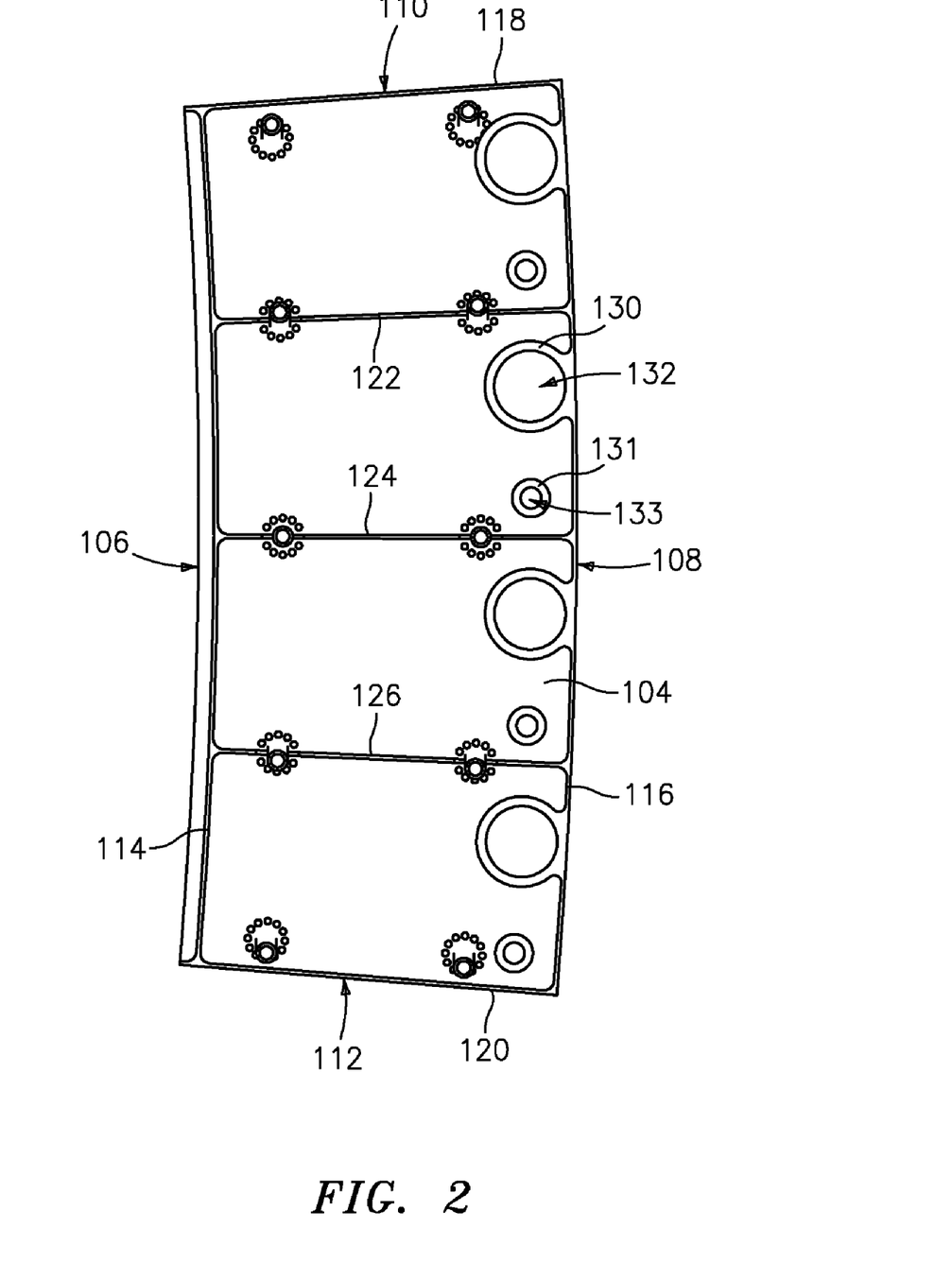
FIG. 2 is an exterior view of a forward heat shield panel of the combustor of FIG. 1.

FIGS. 1A and 2 show further details of the exemplary fore outboard panel 78 (the fore inboard panel 74 being generally similarly formed). The panel has a main body portion 100 having interior (hot-facing the combustion chamber) and exterior (cold-facing away from the combustion chamber) surfaces 102 and 104 (FIG. 1A). The body is circumscribed by a perimeter having leading and trailing portions 106 and 108 and connecting lateral portions 110 and 112 (FIG. 2). A rail system extends from the exterior surface 104 and includes a first portion 114 recessed from the leading edge by a distance D (FIG. 1A). The distal rim portions of the rail system contacts the shell interior surface so that the portions of the rail system have a height H coincident with the separation between major portions of the panel exterior surface and shell interior surface. Exemplary values for D and H are 3.8 mm and 1.7 mm. The rail system further includes a second portion 116 along the trailing edge, lateral perimeter portions 118 and 120 along the lateral edges 110 and 112, and intermediate longitudinal rails 122, 124, and 126. The rail system also includes portions 130 and 131 surrounding combustion process air (mixing/dilution) apertures or orifices 132 and 133 which provide direct communication through aligned corresponding apertures in the associated shell to introduce air from the associated chamber 92 or 90 into the combustion chamber to lean the combustion gases. In the illustrated embodiment, the first orifices 132 are larger than the second orifices 133. These orifices circumferentially alternate along the panel. The respective large and small orifices of the inboard panels are exactly out of phase with those of the outboard panels. Accordingly, a large orifice of one panel will be circumferentially aligned with a small orifice of the other. This creates intermeshing air streams which further enhances mixing within the combustor. The panels further include arrays of film cooling holes 140 extending between the surfaces 104 and 102 (FIG. 1A). In the illustrated embodiment, air is passed through holes 142 in the shell 72 to impingement cooling spaces 144 between the shell interior surface 146 and the panel body exterior surface 104. These holes 142 may be positioned and oriented to direct streams of air against intact portions of the surface 104 to provide impingement cooling of such surfaces. After such direction, the gas passes through the holes 140 which are angled so that their discharge provides a desired film cooling of the surface 102. The shell 72 further includes a group of holes 150 positioned between the leading edge 106 and rail portion 114. These holes are positioned so that their discharge impacts the surface 104 ahead of the rail 114 and flows forward, wrapping around the leading edge 106 and then aftward between the surface 102 and an adjacent portion 160 of a heat shield panel 162 on the bulkhead. The holes 150 serve to initiate film cooling along the panel interior surface and are discussed in further detail below.

Figure 1B:
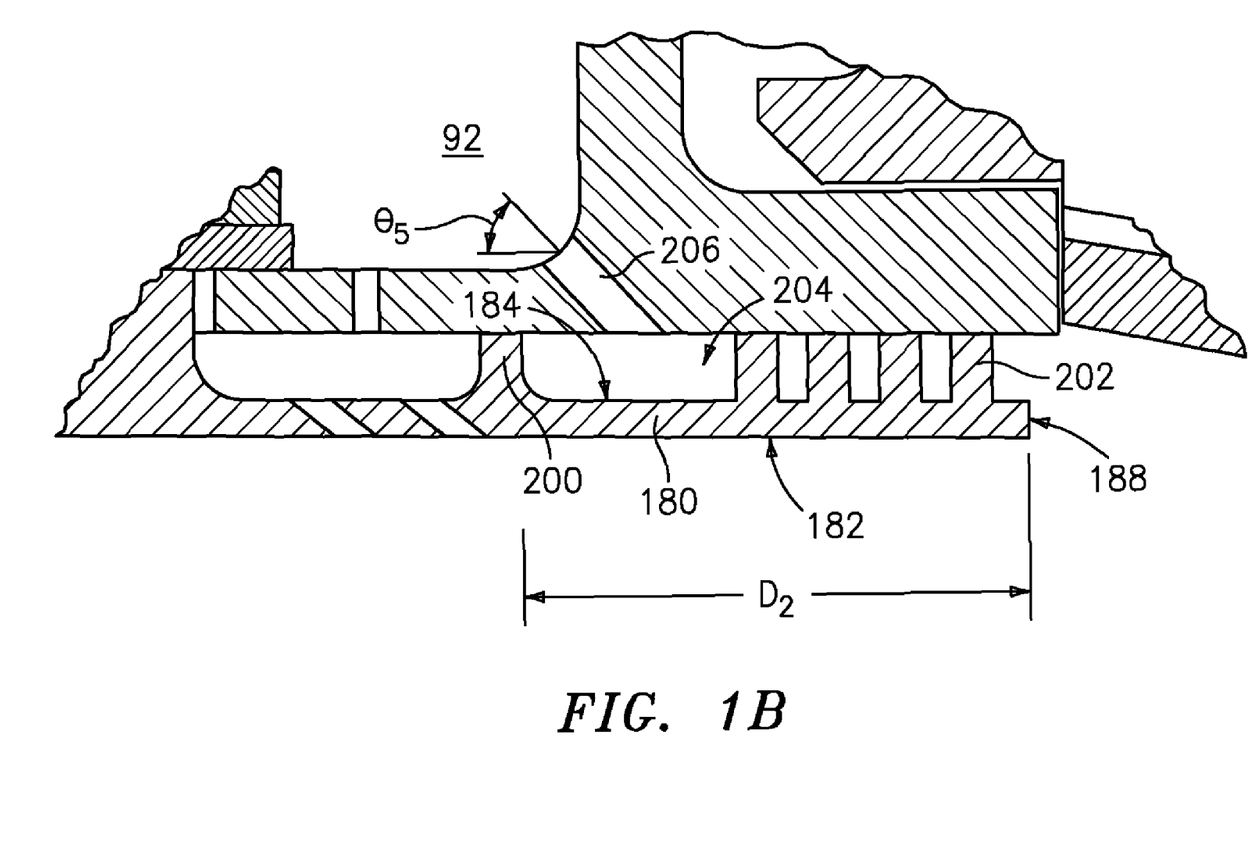
FIG. 1B is an enlarged view of trailing portion of the outboard wall of the combustor of FIG. 1.
Figure 3:
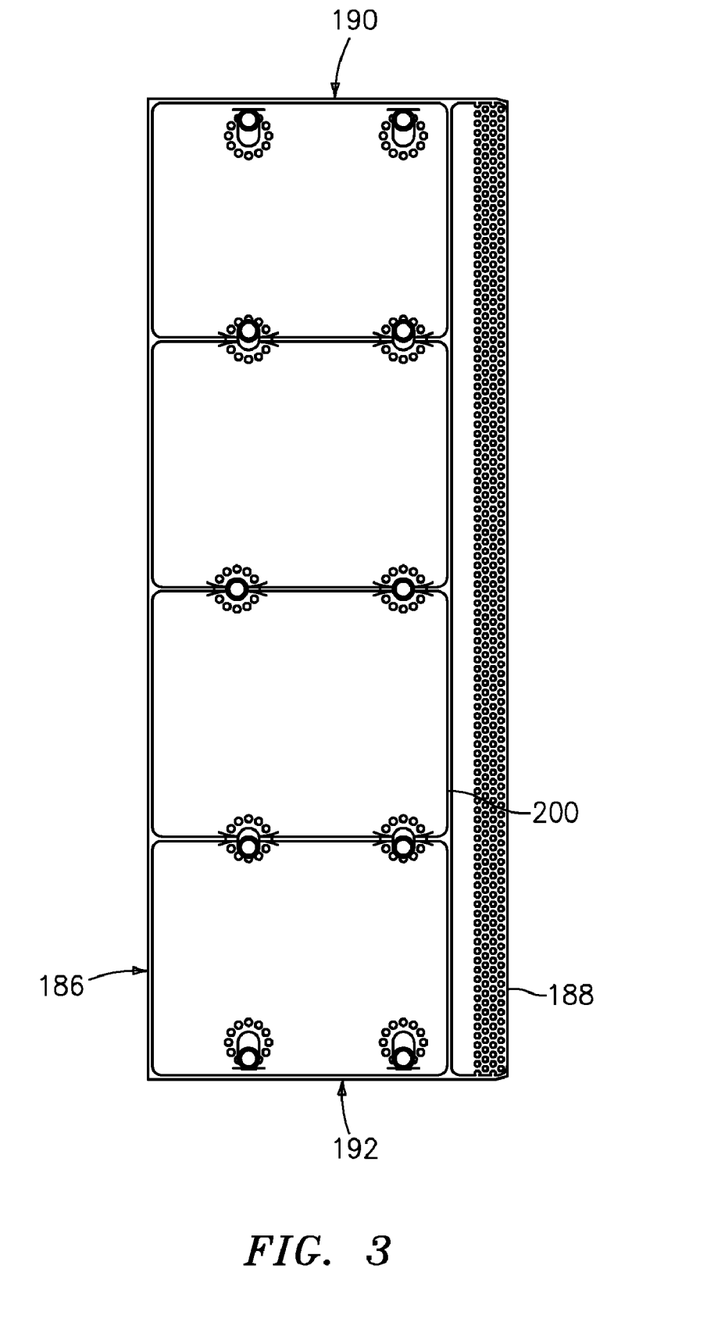
FIG. 3 is an exterior view of an aft heat shield panel of the combustor of FIG. 1.

FIGS. 1B and 3 show further details of the aft outboard heat shield panel 80 (the aft inboard panel may be similar). Many details may be similar to those of the fore panel and, therefore, are not discussed in as great length. For purposes of identification, the panel 80 has a body 180 with interior and exterior surfaces 182 and 184 and leading, trailing, and two lateral edges 186, 188, 190, and 192. The exemplary panel has a rail system with portions along the leading and lateral edges, intermediate longitudinal portions, and a portion 200 forwardly recessed from the trailing edge 188 by a distance $D_2$. The rail system may have a similar height as with the fore panel. Exemplary values for $D_2$ are 12.4 mm for an outboard panel and 8.7 mm for an inboard panel in the exemplary configuration. The choice of $D_2$ will be based on how close the last row of cooling holes can be placed to the combustor exit. This, in turn, is largely determined by combustor exit sealing geometry and the nature of the drilling tool to be used. In the exemplary embodiment, such consideration places the holes farther forward of the aft panel trailing edge along the outboard wall than along the inboard wall, thus the diameter difference. Between the portion 200 and the trailing edge 188, an array of pins 202 extend from the exterior surface 184 toward and contacting the shell interior surface. In the exemplary embodiment, the pin array extends aft from approximately a midpoint of this region. In the exemplary embodiment, the pin array is substantially uninterrupted and includes multiple rows (e.g., four) with the pins of each row being offset (e.g., exactly out of phase) from the pins of the adjacent rows. A chamber 204 is formed between the pin array and the rail portion 200. This space is fed with air from the chamber 92 through holes 206 extending at an angle $\theta_5$ to the local shell surface. An exemplary $\theta_5$ is 46.955°.

Figure 4:
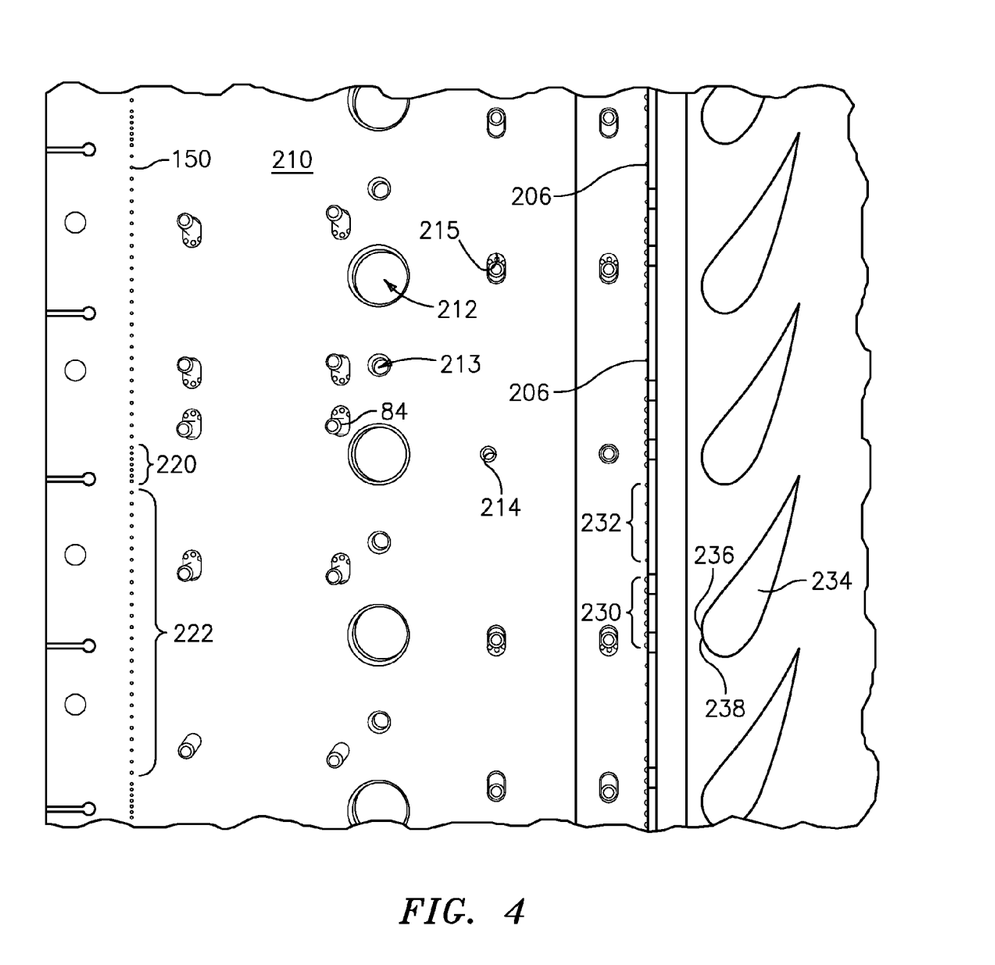
FIG. 4 is an exterior view of a portion of a shell of the combustor of FIG. 1.

The size and distribution of the holes 150 and 206 of FIGS. 1A and 1B, respectively, may be selected to achieve desired cooling properties. FIG. 4 shows an exterior surface 210 of the outboard shell 72. The view shows process air apertures 212 and 213, respectively, coextensive with the associated apertures 132 and 133 of FIG. 2 and circular and elongate mounting apertures 214 and 215 accommodating the panel mounting studs 84 (shown with nuts removed for purposes of illustration). The circular apertures 214 serve to register the central pair of studs of each associated panel while the elongate nature of the holes 215 accommodate lateral pairs to permit local circumferential relative movement upon thermal expansion/contraction of elements. FIG. 4 shows exemplary single-row arrays of the holes 150 and 206. The row of holes 150 is divided into two alternating groups of holes 220 and 222. The holes of these exemplary groups are of substantially equal cross-section. However, the on-center spacing of the first group is smaller (e.g., 30%-70%) to provide an associated region of enhanced flow. Each of these enhanced flow regions is aligned between an associated pair of the fuel injectors/swirlers to provide enhanced cooling to counter the concentration of heat generated immediately downstream of overlapping spray zones such injector/swirlers. In the exemplary embodiment, the number of holes in the first group is smaller than that in the second group and the circumferential span of the first group is much smaller than that of the second (e.g., less than 30% and, more narrowly, less than 20%). Exemplary diameters for these holes are 0.6 mm. Exemplary on-center spacing of the first and second groups is 1.8 mm and 3.5 mm. Other permutations of spacing, size, shape, and the like may be utilized as may be variations of such parameters within groups.

The row of holes 206 is divided into groups 230 and 232, respectively, providing more and less concentrated cooling. Each enhanced flow group 230 is associated with a corresponding vane 234 of the stage 62. The positioning of this group along with the associated angle $\theta_5$ (FIG. 1B) relative to the shell interior surface may be used to substantially counteract a bow wave of the vane 234. The bow wave or "horseshoe vortex" results from the interaction of the combustor output with the vane 234. As flow from the combustor approaches the vane leading edge 238 (which may be coincident or nearly coincident with the forward extremity 236) it stagnates at the leading edge to form a localized region of high static pressure. This stagnation creates high spatial pressure gradients and complex three-dimensional flows particularly in the region where the vane airfoil meets the (outboard) endwall 240 (FIG. 1) and (inboard) platform 242 (FIG. 1). The three-dimensional flows at the vane leading edge tend to wrap around leading edge in a U-shape with one leg along the pressure side and one leg along the suction side thus the term "horseshoe vortex". The pressure gradients make it difficult to cool the endwalls/platforms and adjacent portions of the vane airfoil, as the cooling flow will tend to be directed toward regions of lower static pressure. Additionally, the three-dimensional flows/gradients may drive hot combustor gases back toward the combustor walls.

In the exemplary embodiment, the number, shape, and angling of the holes/passageways 206 helps to direct and meter the flow (subject to having sufficient numbers and size of pins) to provide desired cooling performance while having sufficient velocity and mass flow to counter the bow wave yet not having so great a mass flow so as to constitute an excessive inefficiency. The exemplary group 230 is positioned ahead of the forwardmost extremity 236 of the vane airfoil, shifted slightly toward the pressure side thereof. In the exemplary embodiment, the circumferential spacing of vanes 234 is much smaller than that of the fuel injectors and, accordingly, the circumferential length of the pairs of hole groups are correspondingly smaller. Thus, for example, the circumferential span of the groups 230 and 232 may be nearly equal. Flow concentration is achieved, in the exemplary embodiment, by having larger cross-section holes in the group 230 as well as having a smaller on-center spacing in that group. Exemplary diameter and on-center spacing for the holes of the groups 230 are 1.0 mm and 5.9 mm for an outboard panel and 1.0 mm and 5.1 mm for an inboard panel. Exemplary diameter and on-center spacing for the holes of the groups 232 are 1.4 mm and 3.1 mm for an outboard panel and 1.3 mm and 3.3 mm for an inboard panel. An exemplary circumferential span of the first group is between 60 and 150% that of the second, more narrowly, 80 and 120%.

One or more embodiments of the present invention have been described. Nevertheless, it will be understood that various modifications may be made without departing from the spirit and scope of the invention. For example, when applied as a reengineering of an existing combustor, details of the existing combustor will influence details of the particular implementation. Accordingly, other embodiments are within the scope of the following claims.

What is claimed is:

1. A gas turbine engine combustor comprising:
    an inboard wall;
    an outboard wall; and
    a forward bulkhead extending the inboard and outboard walls and cooperating therewith to define a combustor interior volume,
    wherein, at least a first wall of said inboard and outboard walls comprises:
        an exterior shell; and
        an interior heat shield comprising a plurality of panels having:
            an interior surface;
            an exterior surface;
            a perimeter having leading and trailing edges and first and second lateral edges; and
            a plurality of pins protruding from the exterior surface toward the shell wherein the shell has a plurality of holes for directing air to a space between the shell and heat shield and adapted for preferentially directing said air toward leading edge portions of first stage vanes of a turbine section, the plurality of holes comprising a plurality of first groups and a plurality of second groups, the holes of the first groups being smaller and more closely spaced than the holes of the second groups.

2. The combustor of claim 1 wherein the plurality of holes comprises a plurality of alternating first and second groups of holes having at least partial differences in at least one of size and distribution.

3. The combustor of claim 1 wherein the plurality of holes comprises a plurality of alternating first and second groups of holes having at least partial differences in both size and distribution.

4. The combustor of claim 1 wherein:
    the first groups have a circumferential span between 60% and 150% of a circumferential span of the second groups.

5. The combustor of claim 1 wherein the first wall is the inboard wall and the outboard wall comprises:
    an exterior shell; and an interior heat shield comprising a plurality of panels having:
an interior surface;
an exterior surface;
a perimeter having leading and trailing edges and first and second lateral edges; and
a plurality of pins protruding from the exterior surface toward the shell wherein the outboard wall shell has a plurality of holes for directing air to a space between the outboard wall shell and outboard wall heat shield and adapted for preferentially directing said air toward leading edge portions of said first stage vanes of said turbine section.

6. The combustor of claim 5 wherein:
the outboard wall holes comprise a plurality of first groups and a plurality of second groups, the holes of the first groups being smaller and more closely spaced than the holes of the second groups.

7. The combustor of claim 6 wherein:
the outboard wall hole first groups have a circumferential span between 60% and 150% of a circumferential span of the outboard wall hole second groups; and
the inboard wall hole first groups have a circumferential span between 60% and 150% of a circumferential span of the inboard wall hole second groups 8. The combustor of claim 1 wherein the plurality of pins contacts the shell.

9. The combustor of claim 1 wherein the plurality of pins is a continuous uninterrupted array.

10. The combustor of claim 1 wherein the plurality of pins a plurality of circumferential rows of pins, each row being out of phase with any adjacent row.

11. The combustor of claim 1 wherein the first wall is the outboard wall.

12. A gas turbine engine combustor comprising:
an inboard wall;
an outboard wall; and
a forward bulkhead extending the inboard and outboard walls and cooperating therewith to define a combustor interior volume, wherein, at least a first wall of said inboard and outboard walls comprises:
an exterior shell;
an interior heat shield comprising a plurality of panels having:
an interior surface;
an exterior surface;
a perimeter having leading and trailing edges and first and second lateral edges; and
a plurality of pins protruding from the exterior surface toward the shell; and
means for directing air to a space between the shell and heat shield preferentially toward leading edge portions of first stage vanes of a turbine section, the means comprising a plurality of holes for directing air to a space between the shell and heat shield, the plurality of holes comprising a plurality of first groups and a plurality of second groups, the holes of the first groups being smaller and more closely spaced than the holes of the second groups.

13. The combustor of claim 12 wherein the first wall is the inboard wall and the outboard wall comprises:
an exterior shell; and
an interior heat shield comprising a plurality of panels having:
an interior surface;
an exterior surface;
a perimeter having leading and trailing edges and first and second lateral edges; and
a plurality of pins protruding from the exterior surface toward the shell; and
means for directing air to a space between the shell and heat shield preferentially toward leading edge portions of said first stage vanes of said turbine section.

14. The combustor of claim 13 wherein the means of the outboard wall comprises a plurality of alternating first and second groups of holes having at least partial differences in at least one of size and distribution.

15. The combustor of claim 13 wherein the means of the outboard wall comprises a plurality of alternating first and second groups of holes having at least partial differences both size and distribution.

16. The combustor of claim 12 wherein the plurality of pins contacts the shell.

17. The combustor of claim 12 wherein the plurality of pins is a continuous uninterrupted array.

18. The combustor of claim 12 wherein the plurality of pins a plurality of circumferential rows of pins, each row being out of phase with any adjacent row.

19. The combustor of claim 12 wherein the first wall is the outboard wall.

* * * * *